United States Patent [19]
Hakoun et al.

[11] Patent Number: 5,113,460
[45] Date of Patent: May 12, 1992

[54] OPTICAL DEVICE HAVING AN INTEGRATED OPTICAL COMPONENT, AND METHOD OF MANUFACTURE

[75] Inventors: Roland Hakoun, Domont; Eric Tanguy, Paris, both of France

[73] Assignee: Alcatel Fibres Optiques, Cedex, France

[21] Appl. No.: 688,792

[22] Filed: Apr. 22, 1991

[30] Foreign Application Priority Data

Apr. 27, 1990 [FR] France .................. 90 05407

[51] Int. Cl.⁵ .................. G02B 6/00; G02B 6/36
[52] U.S. Cl. .................. 385/39; 385/88
[58] Field of Search .... 350/96.15, 96.16, 96.20–96.22

[56] References Cited

U.S. PATENT DOCUMENTS

| | | | |
|---|---|---|---|
| 4,647,147 | 3/1987 | Pikulski et al. | 350/96.17 |
| 4,906,068 | 3/1990 | Olson et al. | 350/96.15 |
| 4,948,219 | 8/1990 | Seino et al. | 350/96.22 X |

FOREIGN PATENT DOCUMENTS

0283301  9/1988  European Pat. Off. .

OTHER PUBLICATIONS

Patent Abstracts of Japan, vol. 14, No. 158 (P-1027)[4101], Mar. 27, 1990; & JP-A-2 15 204 (NIT), Jan. 18, 1990.
Patent Abstracts of Japan, vol. 6, No. 104 (P-122)[982], Jun. 15, 1982; & JP-A-57 35 820 (Shimazu Seisakusho) Feb. 26, 1982.

*Primary Examiner*—Akm E. Ullah
*Attorney, Agent, or Firm*—Sughrue, Mion, Zinn, Macpeak & Seas

[57] ABSTRACT

The device includes a first jointing component for joining two fibers to two integrated optic outlet waveguides in the glass substrate, these two fibers are mounted touching one another to constitute a sheet which is itself bonded between two plates of glass, and the spacing of the two corresponding waveguides is equal to the diameter of the fibers, said first jointing component together with its fibers and a second jointing component together with another fiber at the inlet waveguide being bonded against said substrate.

7 Claims, 2 Drawing Sheets

OPTICAL DEVICE HAVING AN INTEGRATED OPTICAL COMPONENT, AND METHOD OF MANUFACTURE

The present invention relates to optical devices such as couplers of the type including an integrated optical component on which optical fibers are terminated.

BACKGROUND OF THE INVENTION

In conventional manner, the technique of "optical integration" makes it possible to create waveguides in a dielectric substrate, generally glass, by locally increasing the refractive index of the glass. These waveguides are made by the method of diffusing ions into the substrate or by the method of depositing layers having a refractive index greater than that of the substrate.

Such integrated optical components are being used more and more in the fields of transmission by means of optical fibers. They are made small in size with their waveguides at very small spacing, and they are suitable for making up various different coupler structures. These different coupler structures include, in particular, Y-couplers having a common branch referred to as the inlet and connected to two "outlet" branches which are at a very small junction angle to each other. These structures also include, for example, proximity couplers having two waveguides which are very close together, at least in a central portion, or other types of coupler which are also known per se.

The main problem encountered in industrial use of integrated optical components is the accuracy with which optical fibers need to be aligned relative to the substrate waveguides. This accuracy is of the order of one micron or less. It is difficult to obtain because of the lack of strength of optical fibers. It is all the more difficult to obtain because the ends of the fibers are close together, leaving little or no freedom for final adjustment by micromanipulation of the fibers.

Thus, it is common practice for integrated optical waveguides to be formed on the glass substrate with their ends far enough apart to enable individual fibers facing the waveguides to be manipulated and to make it easy to bond them to the substrate.

In addition, in order to ensure good mechanical behavior of the fibers while they are being put into position facing the waveguides, and optionally being subjected to final adjustment by micro-manipulation prior to being bonded to the substrate, integrated optical components are known, in particular from the documents FR-A-2 574 950 and FR-A-2 612 302 in which the glass substrate includes not only the waveguides that are formed therein, but also grooves for positioning the fibers. These grooves and the waveguides are aligned as accurately as possible. According to those documents, the grooves are integrally molded in the substrate and the waveguides are formed subsequently on the substrate. This method of manufacture is lengthy and difficult. It requires adjustment by micro-manipulation for end-to-end jointing of fiber after fiber facing the various waveguides.

Document EP-A-0 283 301 also describes a component for end-to-end jointing of fibers to waveguides, the component being constituted by two facing groove plates in which the fibers are held. Each fiber is stripped and has one of its ends lying in the front face plane of the component. This end is fixed to the end of one of the waveguides, by the components being fixed to the substrate. In a variant, the covered fibers are held in the end-to-end jointing component each having a stripped end projecting a little from the component and being bonded to the end of a waveguide when the component is fixed to the substrate.

An object of the present invention is to make it simpler and cheaper to obtain optical devices having integrated optical components with fibers joined end-on thereto, and in particular providing considerably improved mechanical strength in traction.

SUMMARY OF THE INVENTION

The present invention provides an optical device including an integrated optical component having a substantially rectangular glass substrate including integrated optical waveguides, and defining between them a coupler having first ends of said waveguides on one of the end faces of the substrate and at least one second end of the waveguides on the opposite end face of the substrate, and further including a first jointing component for joining first optical fibers to be first ends of the waveguides, and a second jointing component for joining a second optical fiber to each second end, each of the jointing components being bonded to said substrate, said first jointing component being constituted by two glass plates holding said first fibers therebetween, with the spacing of said first fibers being substantially equal to the spacing of the first ends of the waveguides, wherein the spacing of the waveguides, at least at said first ends, is substantially equal to the diameter of said first fibers when covered, and wherein said covered first fibers form a sheet of touching fibers in said first jointing component.

In particular, the inside faces of the plates are plane. Further, the second end-to-end jointing component is identical to the first or is constituted by a part which is pierced by a channel into which the stripped end of the second fiber is inserted and fixed.

The present invention also provides a method of manufacturing the optical device, wherein the method consists in:

forming said waveguides on said glass substrate with the spacing of said first ends of the waveguides being equal to the diameter of first fibers when covered;

assembling the covered first fibers by means of an adhesive so that they touch one another to form a sheet; and bonding two glass plates on opposite faces of the sheet by means of adhesive spread over an internal bonding zone which excludes the end of the sheet that is substantially flush with each of the interface edges constituting interfaces with the substrate, and excluding the portion adjacent to the interface edges.

BRIEF DESCRIPTION OF THE DRAWINGS

An embodiment of the invention is described by way of example with reference to the accompanying drawings, in which.

DETAILED DESCRIPTION

Figure 1:
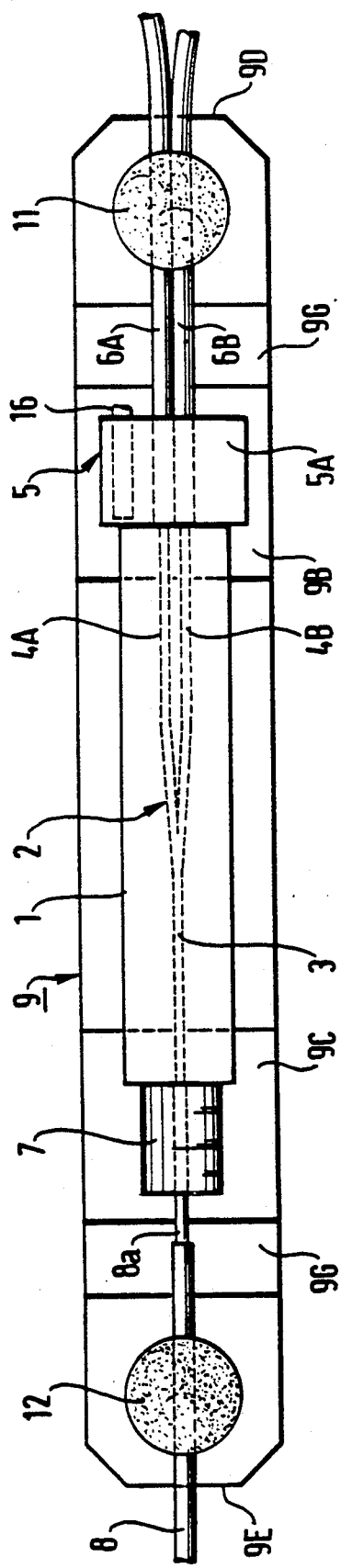
FIG. 1 is a diagrammatic plan view of a device of the invention.

With reference to FIGS. 1 and/or 2, it can be seen that an optical device of the invention or "optical coupler" essentially comprises:

a glass substrate 1 having integrated optical waveguides therein given overall reference 2 and constituting, in the example shown, a Y-coupler having a common branch 3 referred to as the "inlet" waveguide, and a set of two other branches 4A, 4B connected thereto to constitute "outlet" waveguides, with the ends of these waveguides on either side of the junction therebetween occupying respective ones of the small end faces of the substrate 1;

a first component 5 for assembling and holding two optical fibers 6A and 6B, the components being held against the small end face of the substrate containing the outlet waveguides 4A and 4B, and being bonded to the substrate 1 with its two fibers being in end-to-end alignment with respective ones of these two outlet waveguides;

a second component 7 for holding another optical fiber 8, which component is applied against the other small end face of the substrate, with the fiber 8 in the component being in end-to-end alignment with the inlet waveguide 3; and a support piece 9 which is preferably made of metal, and preferably of Invar, with the substrate 1 being mounted thereon and bonded thereto together with its end fiber-holding components 5 and 7, and on which fibers are bonded at opposite ends of the substrate and its end components in zones 11 and 12 near the ends of the support piece, which zones are a few millimeters across.

The outlet waveguides 4A and 4B are at a very small angle to each other on the glass substrate 1, which angle is of the order of one degree to a few degrees, where they join the inlet waveguide. In addition, they are also formed so that their respective ends terminate on the small end face of the substrate at a mutual spacing equal to the diameter of the covered optical fibers connected thereto. For the fibers 6A and 6B that have a 250 micron diameter covering, this spacing is 250 microns.

The first component 5 together with its fibers 6A and 6B serves to hold these two fibers assembled together in a sheet. The way it is implemented can be seen with reference to FIGS. 1 and 2, and more particularly with reference to FIG. 3 and/or FIG. 4.

To make up the sheet designated 6, the two covered fibers 6A and 6B are initially bonded side by side by means of a fillet of a resin that polymerizes under ultraviolet radiation and deposited between the fibers on their resin coverings. The end of the sheet formed in this way is preferably cut by means of an appropriate cutting tool, so as to obtain a new end which is very clean and which is free in particular from any of the adhesive at the ends of the fibers.

Figure 3:
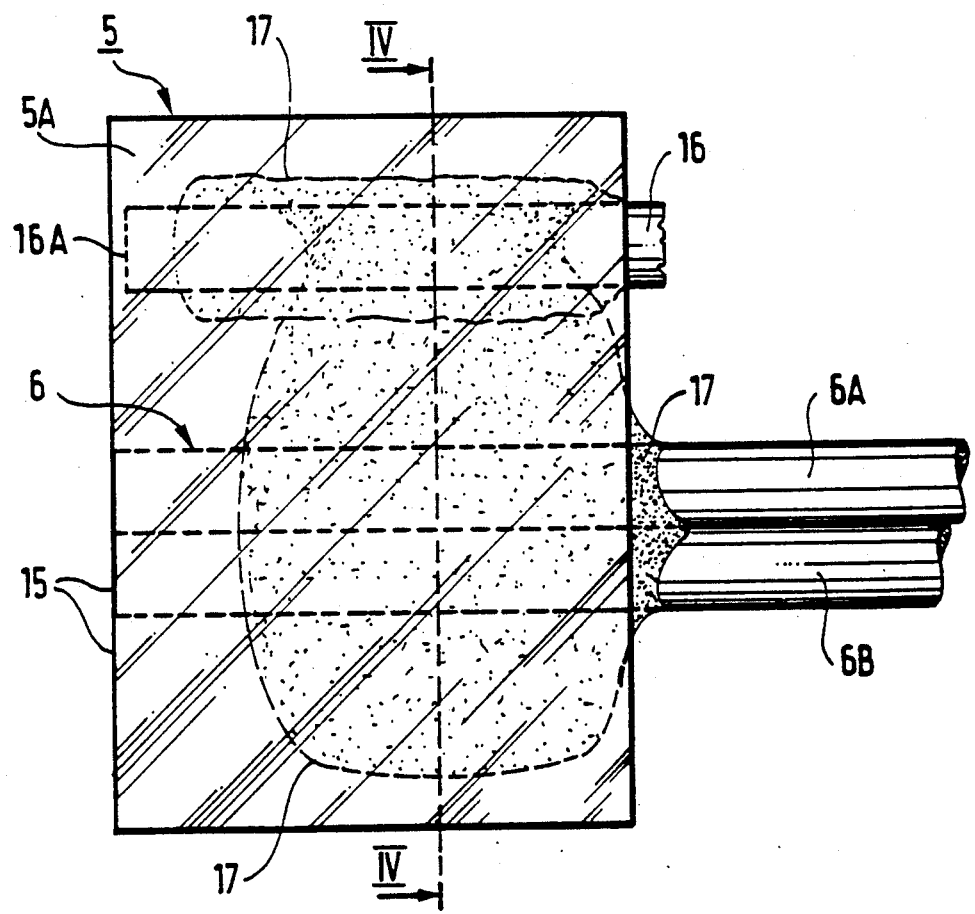
FIG. 3 is a plan view on a larger scale of one of the components of the FIG. 1 device.
Figure 4:
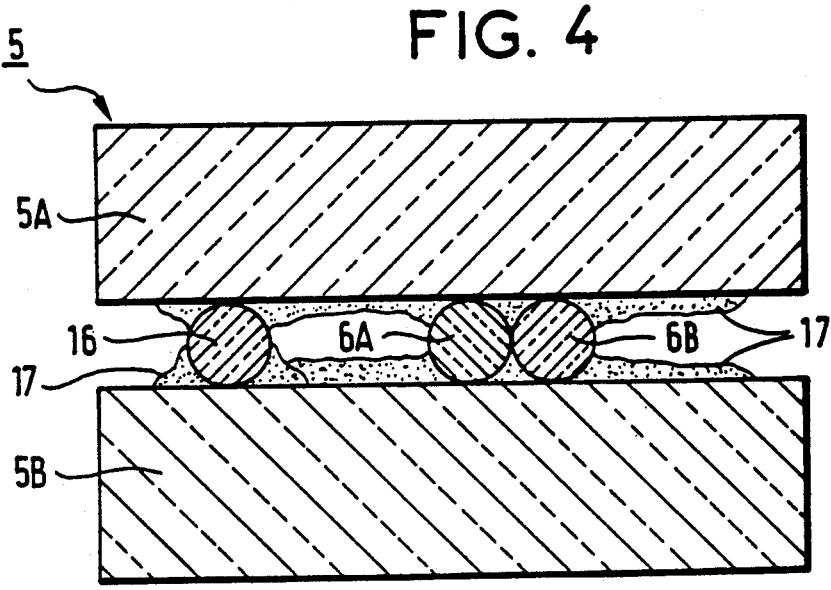
FIG. 4 is a section view through said component on line IV—IV of FIG. 3.

This sheet is then bonded between two plates of glass 5A and 5B using the same type of adhesive as before. This operation is performed while taking care to ensure that the end of the sheet is exactly flush with the two facing edges of the plates defining the interface edges of the connection, and that they receive no adhesive. This end may optionally be rectified and is assumed below to be rectified. As shown in FIG. 3, the rectified end of the sheet 6 is flush at 15 with the above-mentioned connection interface edges, and sheet adhesive between the plates is spread between the plates on either side of the sheet over a wide zone 17 which excludes the portion adjacent to the interface edges such as the rectified end of the sheet 6.

For the purpose of making this assembly, an additional fiber 16 referred to as a "wedge" fiber is mounted independently to one side of the fibers in the sheet 6 and like them is bonded between the plates of glass. The end 16A of the wedge fiber 16 is set back a little from the interface edges of the plate and is free from adhesive. This wedge fiber 16 is preferably bonded to one of the plates before the sheet 6 is bonded thereto.

Figure 2:
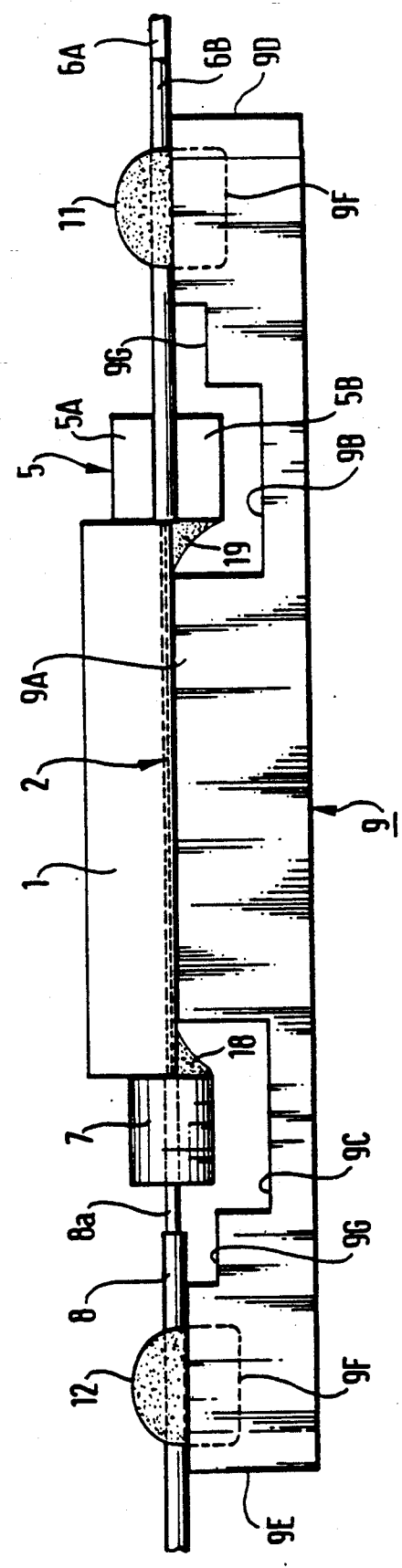
FIG. 2 is an elevation view of the FIG. 1 device.

In FIGS. 1 and 2, the second component 7 serves to hold the single fiber 8 end-to-end with the inlet waveguide 3. It is constituted by a small slab or tube referred to as a ferrule and pierced with a channel which is not referenced. The end 8A of the fiber 8 is stripped and is threaded through and then bonded to the ferrule with its end lying flush with the end face that serves as the interface, and being free from adhesive.

In a variant, this second component could be constituted like the component 5, with the fiber 8 replacing the above-mentioned sheet 6 between two sheets of glass where it would then remain covered with its resin covering.

The two components are mounted to respective ends of the substrate by means of clamps mounted on micrometer displacement means enabling the final position adjustment of the fibers to be performed with the required accuracy after the fibers have been installed approximately in alignment together with the respective waveguides. By monitoring the light flux coming from the fiber 8 and travelling in the fibers 6A and 6B after passing through the waveguides 2, it is possible to detect the optimum coupling and thus the optimum positioning. Once this adjustment has been achieved, the components 5 and 7 are bonded to the substrate by means of a polymerizable adhesive, as shown at 18 and 19, with the adhesive extending between their contacting faces and over the margins of the substrate 1.

The assembly constituted by the integrated optical component 1 and the components 5 and 7 including their fibers is then mounted and bonded on the support piece 9 which is appropriately machined prior thereto.

The central portion 9A of the support piece 9 has a flat on which the glass substrate 1 rests. The substrate is preferably bonded to the flat in order to avoid any risk of subsequent vibration. Also advantageously, as shown in FIG. 2, the substrate is mounted with its face in which the wave-guides 2 are formed applied to the flat so as to prevent the jointing components 5 and 7 projecting above the resulting coupler.

On either side of the central plate 9A, the support piece 9 has two respective notches 9B and 9C in which the jointing components 5 and 7 are received without making contact. The two ends 9D and 9E of the support piece 9 are rectified to a slightly different height from the central flat 9A so as to define support surfaces for the two fibers 6A and 6B in the sheet and for the fiber 8. Each of these ends has a central cavity 9F which receives adhesive for bonding to the corresponding fiber or sheet of fibers. This adhesive penetrates into the cavity and forms a dome over the fiber(s). It holds the fibers captive in resin that has set and ensures that the fibers are well held at opposite ends of the substrate and beyond the jointing components 5 and 7.

The support piece 9 also has intermediate shoulder portions such as 9G between each of its ends and the adjacent notch for receiving the jointing component 5 or 7, for the purposes of good mechanical strength.

Implementation of the resulting coupler is greatly simplified and thus made cheap. It also has very good mechanical strength in traction and under varying environmental conditions, and it has very low losses in the connection formed between the fibers and the waveguides.

We claim:

1. An optical device including an integrated optical component having a substantially rectangular glass substrate including integrated optical waveguides, and defining between them a coupler having first ends of said waveguides on one of the end faces of the substrate and at least one second end of the waveguides on the opposite end face of the substrate, and further including a first jointing component for joining first optical fibers to first ends of the waveguides, and a second jointing component for joining a second optical fiber to each second end, each of the jointing components being bonded to said glass plates holding said first fibers therebetween, with the spacing of said first fibers being substantially equal to the spacing of the first ends of the waveguides, wherein the spacing of the waveguides, at least at said first ends, is substantially equal to the diameter of said first fibers when covered, wherein said covered first fibers form a sheet of touching fibers in said first jointing component, wherein the inside faces of the plates of said first jointing component are plane, wherein said optical device further includes a support piece having a central flat on which said substrate is mounted, and two ends on which said optical fibers are supported and bonded beyond said first and second jointing components, and said second jointing component is constituted by a slab or tube of glass having a channel passing therethrough in which the stripped end of the single second fiber is threaded and held, and is bonded against the substrate during alignment of said second fiber with the corresponding second end of the waveguides.

2. An optical device according to claim 1, wherein the ends of the support piece have respective cavities for receiving the adhesive for bonding the fibers in respective zones that are several millimeters across.

3. An optical device according to claim 1, wherein said support piece has two notches on either side of said central flat for receiving said first and second jointing components without making contact therewith.

4. An optical device according to claim 1, wherein said second jointing component is made in the same manner as the first jointing component to hold each second fiber by means of its covering.

5. A method of manufacturing the optical device including an integrated optical component having a substantially rectangular glass substrate including integrated optical waveguides, and defining between them a coupler having first ends of said waveguides on one of the end faces of the substrate and at least one second end of the waveguides on the opposite end face of the substrate, and further including a first jointing component for joining first optical fibers to the first ends of the waveguides, and a second jointing component for joining a second optical fiber to each second end, each of the jointing components being bonded to said substrate, said first jointing component being constituted by two glass plates holding said first fibers therebetween, with the spacing of said first fibers being substantially equal to the spacing of the first ends of the waveguides, wherein the spacing of the waveguides, at least at said first ends, is substantially equal to the diameter of said first fibers when covered, wherein said covered first fibers form a sheet of touching fibers in said first jointing component, and the inside faces of the plates of said first jointing component are plane, said method comprising:

forming said waveguides on said glass substrate with the spacing of said first ends of the waveguides being equal to the diameter of said first optical fibers when covered;

assembling the covered first fibers by means of an adhesive so that they touch one another to form a sheet;

bonding said two glass plates on opposite faces of the sheet by means of adhesive spread over an internal bonding zone which excludes the end of the sheet that is substantially flush with each of the interface edges constituting interfaces with the substrate, and excluding the portion adjacent to the interface edges, and placing a wedge fiber together with said sheets between said plates, said wedge fiber being offset from the sheet and having its end set back from the interface edges of the plates, and being free from any adhesive.

6. A method according to claim 5, further comprising in cleaving the end of the made-up sheet before it is mounted and bonded between said plates, thereby causing it to present a new end which is rectified and free from adhesive.

7. A method according to claim 6, further comprising in prepositioning the first and second jointing components against the substrate with their fibers in approximate alignment with the ends of the waveguides, and adjusting their positions accurately by monitoring the maximum flux flowing through said fibers and said waveguides, prior to bonding said first and second jointing components to said substrate.

* * * * *